United States Patent [19]
Rowen
[11] Patent Number: 4,889,999
[45] Date of Patent: Dec. 26, 1989

[54] MASTER ELECTRICAL LOAD CONTROL SYSTEM

[75] Inventor: Michael J. Rowen, Center Valley, Pa.
[73] Assignee: Lutron Electronics Co., Inc., Coopersburg, Pa.

[21] Appl. No.: 249,543
[22] Filed: Sep. 26, 1988
[51] Int. Cl.[4] ........................ H01H 47/00; H02P 5/00
[52] U.S. Cl. ........................................ 307/31; 307/115; 307/38; 315/295; 315/360; 315/DIG. 4; 323/239
[58] Field of Search .............................. 307/11, 34–41, 307/115–117, 132 R, 132 E, 125, 129, 141, 141.1, 141.4, 141.8; 323/239, 272, 324, 905; 315/64, 219, 314–319, 291, 292, 293, 294, 295, 320, 216, 299, 360, 361, 324, 308, 198, 199; 340/310 R, 310 A; 362/233, 85, 239, 286, 293, 319, 386, 419

[56] References Cited

U.S. PATENT DOCUMENTS

| | | | |
|---|---|---|---|
| 3,697,821 | 10/1972 | Johnson | 315/361 U X |
| 4,095,139 | 6/1978 | Symonds et al. | 315/294 X |
| 4,206,443 | 6/1980 | Britton | 307/38 X |
| 4,225,808 | 9/1980 | Saraceni | 315/360 X |
| 4,381,456 | 4/1983 | Saito et al. | 307/115 X |
| 4,388,567 | 6/1983 | Yamazaki et al. | 315/DIG. 4 X |
| 4,395,660 | 7/1983 | Waszkiewicz | 315/DIG. 4 X |
| 4,521,843 | 6/1985 | Pezzolo et al. | 364/145 |
| 4,563,592 | 1/1986 | Yuhasz et al. | 307/115 |
| 4,575,660 | 3/1986 | Zaharchuk et al. | 315/295 |
| 4,689,547 | 8/1987 | Rowen et al. | 323/239 |
| 4,691,341 | 9/1987 | Knoble et al. | 315/360 X |
| 4,727,296 | 2/1988 | Zaharchuk et al. | 315/295 |
| 4,745,351 | 5/1988 | Rowen et al. | 323/239 |
| 4,772,824 | 9/1988 | Gulledge | 315/291 |

OTHER PUBLICATIONS

"Planning Your Touch-Plate Lighting Control System," pp. 10-21, Touch-Plate International, Emeryville, Calif., LiteTouch® Lighting Control Systems Brochure.

Lightolier Controls Brochure Emercon Data Corp-RCSS Relay System Brochure.

Lutron Electronics Co.-Aurora Preset Control Brochure P/N360-088 Lutron Electronics Co.-Versaplex Manual Slide Control Brochure P/N 360-101.

X-10[R] Powerhouse™ Technical Note, "The X-10 Powerhouse Power Line Interface Model #PL513"-pp. 1-13, back cover.

*Primary Examiner*—William M. Shoop, Jr.
*Assistant Examiner*—Paul Ip
*Attorney, Agent, or Firm*—James Riesenfeld

[57] ABSTRACT

A system controls power to multiple a.c. lighting loads from both a central location and from individual controls that are located near the loads. The system includes individual wallbox dimmers that include enabling switches, a master control, and isolation means to accept input signals from the master control and to provide output signals to the dimmers. In a preferred embodiment, a dimmer also provides to the master control a signal that indicates the power being provided to the load that the dimmer controls. Preferably the individual controls provide linear slide dimming, in which the power provided to a load is determined by the slider position. The system permits simplified installation and replacement of system components.

33 Claims, 4 Drawing Sheets

MASTER ELECTRICAL LOAD CONTROL SYSTEM

BACKGROUND OF THE INVENTION

1. Field of the Invention

This invention relates to a system for controlling power to multiple a.c. lighting loads from both local controls and a central location.

2. Description of the Related Art

Systems are known for controlling lighting loads from both a master control and from local controls that are near the loads.

Remote control master switching systems are available from General Electric. These systems include master selector switches to provide individual local control or master control. A similar system is available from Touch-Plate International, Inc., of Emeryville, CA.

Centrally-controlled dimming systems are available from LiteTouch, Inc. and from Electro Controls Inc., both of Salt Lake City, UT.

The Touch-Plate, LiteTouch, and Electro Controls master control systems all use a remote power control panel that contains triacs and relays to control (i.e., to dim or switch) the power to the load. The controls for the system include a centrally located master station and, dispersed throughout a building, buttons to turn the lights on and off or to provide "raise/lower" dimming of the lights. Raise/lower dimming is accomplished by pushing a button to raise or lower the power to the lighting load. When the desired level is reached, the button is released.

Another system for central dimming of lighting is available from Lightolier Controls, Secaucus, NJ. That system involves multiple local ("Easyset") controls that can provide raise/lower dimming. Multiple Easyset dimmers can be operated through a single master; however, they must all be on the same circuit, which, in accordance with the National Electrical Code, limits total power to 2000 W.

A number of these systems include indicator lights to show system status at the local and/or master controls; however, each has a common drawback. The local controls can only dim, if at all, by the raise/lower method. This dimming method does not permit light levels to be changed rapidly, nor does the dimmer actuator position provide a visually-apparent indication of lighting level.

Lutron Electronics Co., Coopersburg, PA provides central dimming and switching control of multiple zones of lighting with Versaplex ® and Aurora ® dimming systems. These systems do not include wallbox dimmers dispersed to the spaces in which lighting is being controlled, instead requiring centralized power cabinets.

A system available from Enercon Data Corp., of Minneapolis, MN, uses power relays, which can be mounted in junction boxes, throughout a building and can be locally or centrally switched. In order to dim an area with this system, a standard dimmer may be located near the load; however, the enabling switch that turns power to the dimmer on and off must be separated from the dimmer by a physical barrier (for reasons discussed below). As a result, separate dimmers and switches are required, increasing the number of controls on the wall and complicating the wiring.

SUMMARY OF THE INVENTION

In accordance with the present invention, a system to control power from an a.c. line to a plurality of loads, including lighting loads, comprises, in combination, (a) master control means for controlling the power provided to said loads; and (b) isolation means to accept input power-control signals from said master control means and provide output power-control signals to a plurality of wallbox dimmers, each controlling one of said lighting loads, each of said dimmers comprising, in proximate relationship, (i) an enabling means to take command from said master control and isolation means and (ii) a dimming circuit for controlling the power provided to said lighting loads.

The system allows a number of lighting loads to be controlled from a central master control, while permitting the loads to be dimmed from individual local controls that are near the loads. The local controls include an enabling means, such as a switch, which takes command from the master control and enables the dimmer to control power to the load. An advantage of the present system over prior art systems is that the individual controls can be wallbox dimmers. These dimmers combine power, an enabling switch, and dimming control in a single unit, thus simplifying their installation and replacement. In a preferred embodiment, the on/off status of the lighting loads can be displayed at the master control and/or at the individual controls.

DETAILED DESCRIPTION OF THE INVENTION

As used in the present specification and appended claims, a lighting load consists of one or more lamps that are switched and/or dimmed in unison. In many lighting control applications, it is desirable to turn a number of lighting loads on and off from a centralized master control. In these situations, it is often desirable, as well, to control lighting levels independently at individual controls near the load locations.

Figure 1:
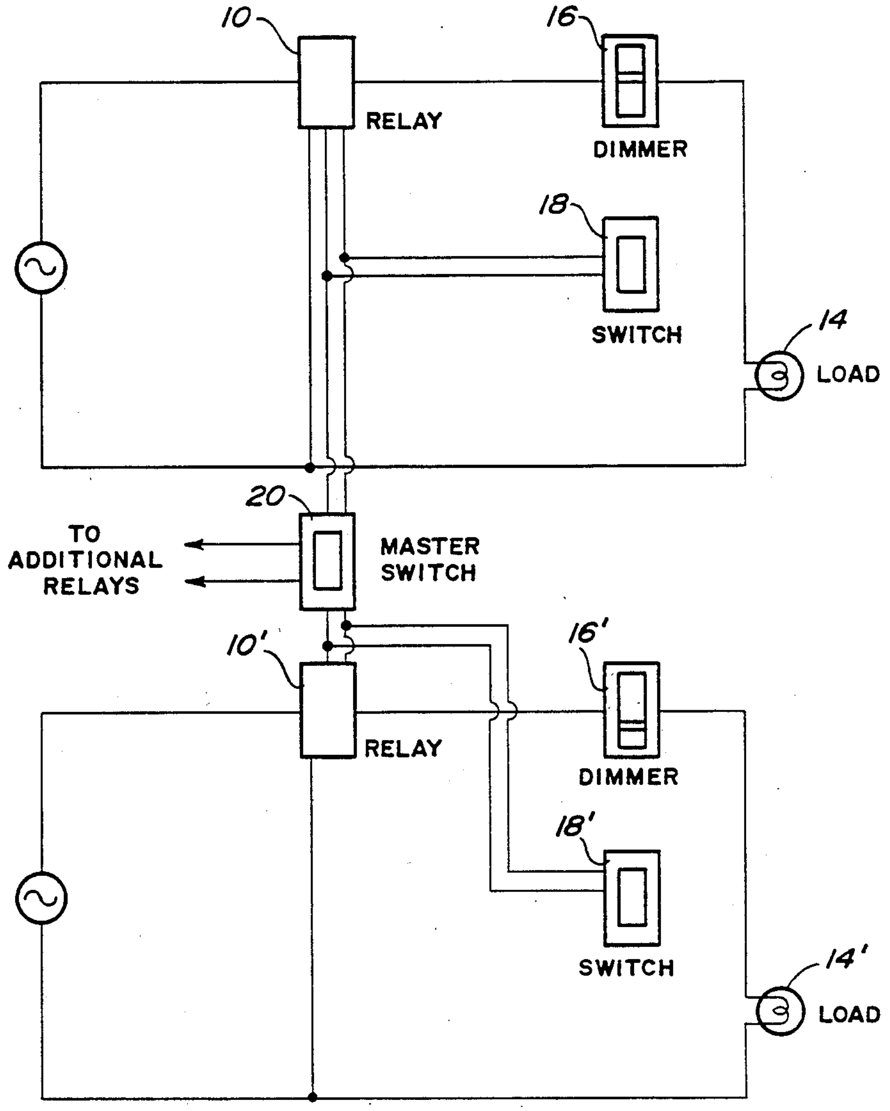
FIG. 1 (PRIOR ART)
FIG. 1 depicts a prior art load control system.

FIG. 1 is a schematic that shows how this dual-control method is accomplished in a prior art system (such as the Enercon Data Remote Control Signaling System (RCSS)). Line voltage—120 V in the U.S.—is carried to transformer relays in junction boxes. The relays, such as relays 10 and 10', may be dispersed throughout a building. The power provided to loads 14 and 14' may be controlled by local dimmers 16 and 16', respectively. Note that these circuits are "Class 1" circuits (as defined in the National Electrical Code) and carry line voltage. Switching of the power is accomplished by local enabling switches, such as 18 and 18', and by master control switch 20, which turns the entire system on and off.

As shown, the system includes two relays that are commonly mastered; however, additional relays could be included. A limitation of this system is that no power is supplied to dimmer 16 if relay 10 is in the "off" mode. Before dimmer 16 can be operated, local enabling switch 18 must first switch relay 10 to the "on" position. Because of this limitation, any load 14 that is to be locally dimmed must have a local enabling switch mounted nearby.

Note that the wiring to local switches 18 and 18' and to master switch 20 may be "Class 2" (as defined in the National Electrical Code). Class 2 circuits generally carry lower voltages and have certain power limitations—power is either inherently limited, thus requiring no overcurrent protection, or is limited by a combination of a power source and overcurrent protection. Dimmer 16 and switch 18 may both be located in the same area; however, since the dimmer is supplied by a Class 1 circuit and the switch by a Class 2 circuit, the National Electrical Code requires that the circuits be separated by a physical barrier. The system of the present invention eliminates the need for this physical barrier between the local dimmer and enabling switch and permits the dimmer and switch to be in a proximate relationship in a single wallbox, as described below. Thus, the present invention simplifies wiring and permits one wall control device to perform both dimming and switching.

Figure 2:
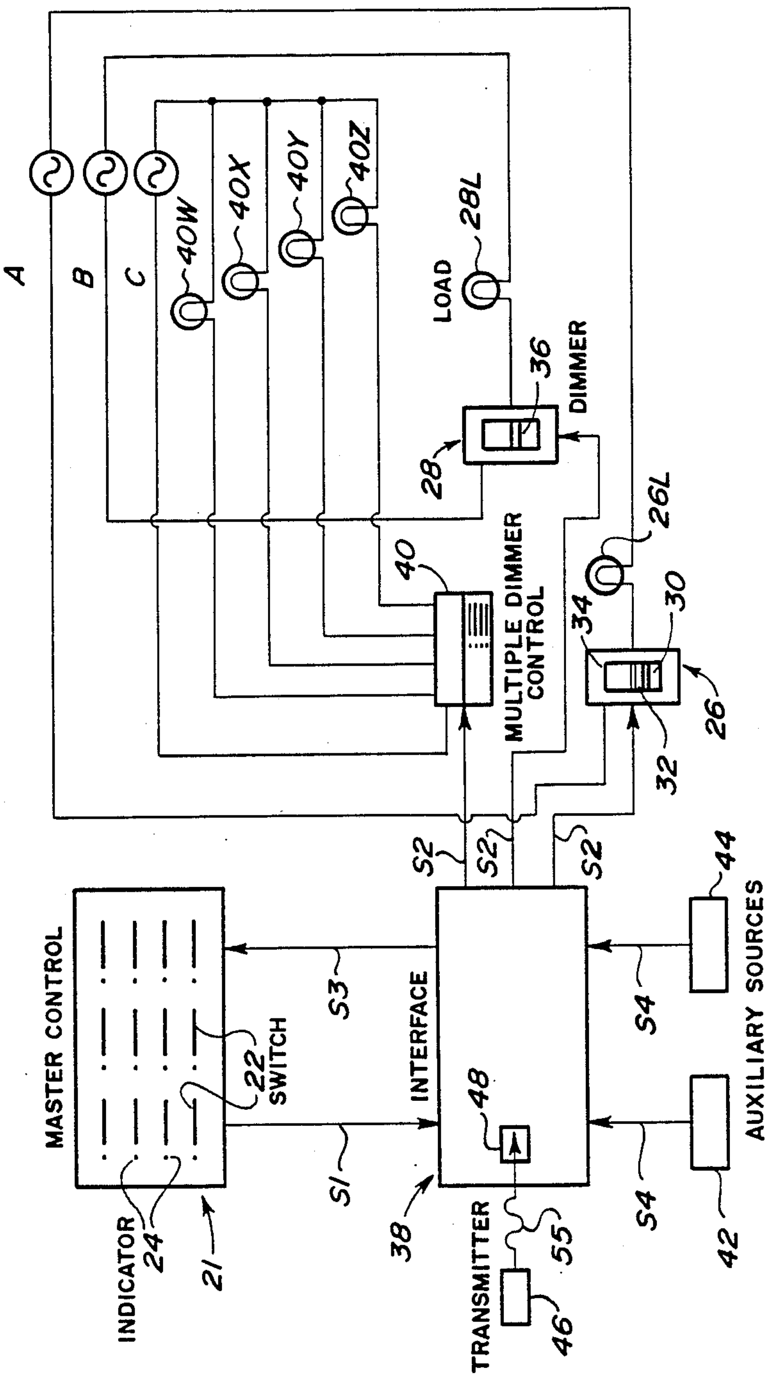
FIG. 2 is a block diagram of an embodiment of the present invention.

FIG. 2 depicts an embodiment of the present invention. A master control panel 21 includes switches 22 to control a number of dispersed lighting loads. Optionally, each switch has a corresponding indicator 24 that shows whether power to that load circuit is on or off. The indicators can be any of a number of devices, well known in the art, that show system status, such as pilot lights, analog indicators, liquid crystal displays, etc. A preferred way of indicating system status comprises LED lamps that are bright when power to the controlled circuit is on and either dim or off- whichever is preferred—when power to the controlled circuit is off. Indicators 24 in FIG. 2 are LEDs.

Wallbox dimmers 26 and 28 control lighting loads 26L and 28L, respectively. Although these loads are symbolically depicted as being incandescent lamps, they can as well be gas discharge lamps, low voltage incandescent lamps, or other lamps well known in the art.

Figure 3:
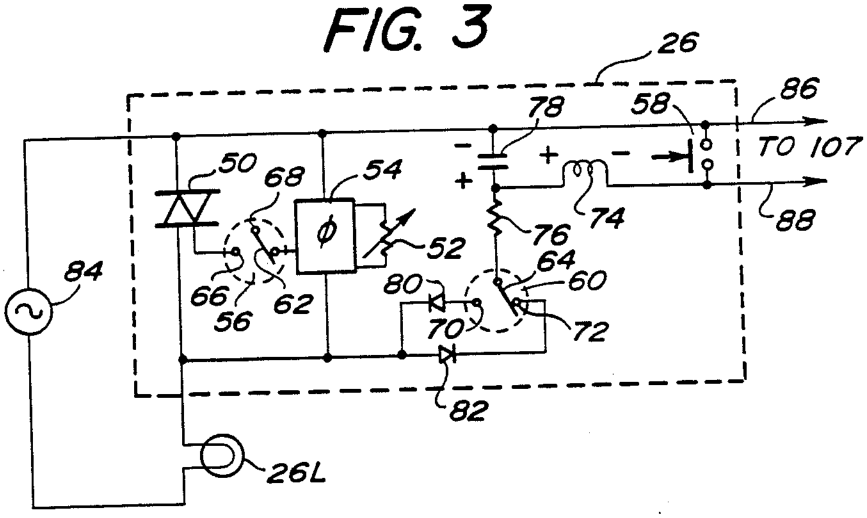
FIG. 3 is a schematic of a dimmer component of the present invention.

Dimmer 26 houses a conventional dimming circuit and an enabling means. Optionally, dimmer 26 includes an actuator slider 30 and an enabling push-button 32, contained in slider 30, which operates to enable the power control function of dimmer 26. Once dimmer 26 is enabled by push-button 32, the position of slider 30 instantaneously determines the power provided through the dimming circuit to load 26L; i.e., the amount of power is determined by the slider setting. If a different power level is desired, the slider can again be moved to adjust the power. Alternatively, the slider can be moved to a desired setting while power to the load remains off. Depressing the push-button then gives the desired power level. In another embodiment, there can be more than one dimmer controlling a lighting load. In that case, the push-button is depressed to take control of the power to the load at that dimmer. As before, depressing the push-button provides to the load a value of power that is determined by the slider setting. Optional indicator lamp 34 lights when power to the load is on and is either dim or off, whichever is preferred, when power to the load is off. A schematic of the circuitry of dimmer 26 is shown in FIG. 3 and is discussed later.

Dimmer 28 can be a different type of dimmer, in which moving slider 36 automatically enables dimmer 28 to control power to load 28L. Thus, moving slider 36 to the desired setting will instantaneously provide the desired power level, whether or not dimmer 28 is initially in control of the power. A mechanism for accomplishing this function is disclosed in U.S. Pat. No. 4,689,547, issued Aug. 25, 1987, to M. Rowen et al.

Independent dimmer controls 26 and 28 communicate with master control 21 through interface 38. Interface 38 isolates input signals S1, which come from master control 21, from line-power-level output signals S2, which go to the local controls. Preferably, the signals between master control 21 and interface 38, including optional system status signals S3, are low voltage signals and are carried by Class 2 circuits, defined earlier.

Master control 21 and interface 38 may be housed separately, as shown in FIG. 2, or, if desired, may be combined within a single housing. Output from interface 38 may optionally power multiple-dimmer systems (i.e., multiple dimmers in a single enclosure). For example, multiple-dimmer control 40 controls power to a number of lighting loads, 40W, 40X, 40Y, 40Z, each of which can be adjusted independently. Note that separate power lines A, B, and C power controls 26, 28, and 40, respectively, even though these controls are all commonly "mastered" (by master control 21). If these controls power lighting loads, the National Electrical Code limits these circuits to a maximum of 16A (~2000 W maximum power) each. However, additional circuits could be present, all controlled by master control 21. The National Electrical Code also prohibits circuits that permit current flow from the load side of one circuit protector (e.g. breaker) to the load side of another circuit protector. Thus, when more than 2000 W is to be controlled, more than one circuit is required. Some prior art systems that are commonly mastered (such as the Lightolier Easyset) do not include isolation between the mastering and power functions, which is provided by interface 38 in the present invention. Thus, all commonly-mastered loads are supplied from a single power line, and all lighting loads are limited to a combined total of about 2000 W. Although the description of the control system of this invention has focused on lighting loads, the loads controlled by the system may also include non-lighting loads, such as fans, motors, etc.

Besides serving to isolate the low voltage signals of the master control from the line voltage signals to the dimmers and other controls, interface 38 can optionally accept inputs S4 from auxiliary sources, schematically depicted as 42 and 44. These sources may include timeclocks, occupancy sensors, security systems, and other devices, related to lighting control or unrelated. These inputs may be switch closures or electrical inputs. The inputs may also be radiated inputs such as infrared or radio frequency signals, such as S5 from transmitter 46, that are detected by sensor 48 on the interface. These auxiliary sources can, in turn, interact with the master control and, indirectly, with the independent dimmers; thus, these auxiliary sources can control and/or be controlled by the other devices that are connected to the master control.

FIG. 3 is a schematic of an embodiment of wallbox dimmer 26. Controllably conductive device 50 provides to a load power that is determined by a phase angle set by potentiometer 52 of phase control circuit 54. Switch 56 and switch 60 are two poles of a double pole, double throw latching relay. Movable contacts 62 and 64 of relay poles 56 and 60, respectively, move in tandem when relay coil 74 is pulsed. When enabling switch 58 is depressed, capacitor 78 discharges through relay coil 74 and switch 58. Thus, relay coil 74 is energized in the polarity shown, moving contact 64 of pole 60 to contact 70. Simultaneously, moving contact 62 of pole 56 moves to contact 66. This contact configuration constitutes a dimmer "on" condition, since triac 50 is gated on by phase control circuit 54 through the switch closure provided by pole 56. Note that capacitor 78 will now charge in a polarity opposite to that shown, through resistor 76 and diode 80. The power to charge capacitor 78 is derived from AC power source 84 through load 26L when triac 50 is in its non-conducting state. (It is common for all phase control dimmer triacs to have a brief non-conducting period at the beginning of each half cycle, even when the dimmer is set at full power.) When switch 58 is depressed again, capacitor 78 discharges through relay coil 74, causing contacts 64 and 62 to move into contact with contacts 72 and 68, respectively. Triac 50 is now disconnected from phase control circuit 54, and the dimmer is in an "off" state. Simultaneously, diode 82 is switched in series with resistor 76 and capacitor 78, which charges capacitor 78 in the polarity shown. Thus, consecutive closures of switch 58 alternately switches dimmer 26 on and off. Lines 86 and 88 connect dimmer 26 to interface 38.

Figure 4:
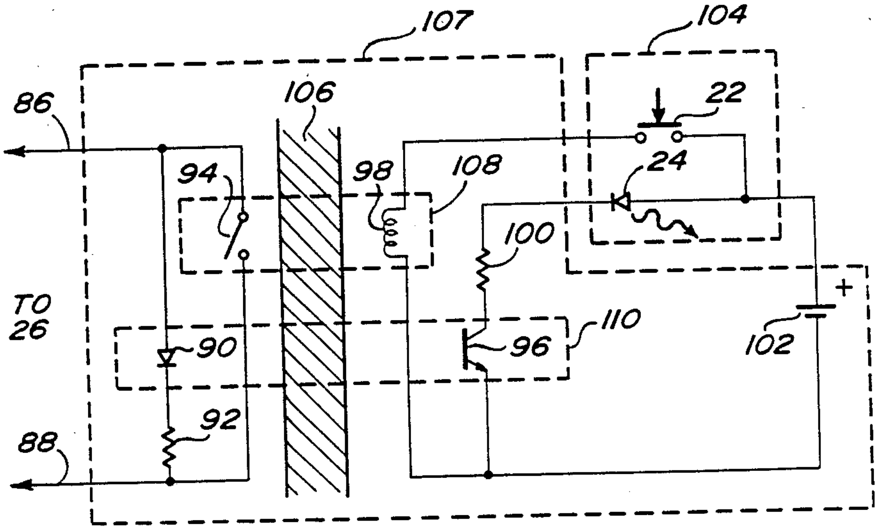
FIG. 4 is a schematic of elements of an interface and master control of this invention.

FIG. 4 depicts an embodiment of circuits that perform the functions of master control 21 and interface 38. 107 is the circuit associated with each input/output pair of interface 38. 104 is the circuit associated with each input/output pair of master control 21. Capacitor 102 is a DC power supply that is charged from an external source (not shown) and is used to power LED 24 and relay 108. Switch 22, when closed momentarily, energizes relay coil 98, which closes switch 94 (which is a relay contact) for as long as switch 22 is held closed. This closure of switch 94 discharges capacitor 78 in dimmer 26 (see FIG. 3) through relay coil 74, toggling dimmer 26 on or off. Note that switches 94 and 58 (in dimmer 26) have similar effects.

When dimmer 26 is in the "on" state, capacitor 78 is charged opposite to the polarity shown, line 86 is positive with respect to line 88 and current flows through LED 90 and resistor 92. Light emitted by LED 90 causes photo-transistor 96 to conduct current from capacitor 102 through LED 24 and resistor 100.

When dimmer 26 is off, line 88 is positive with respect to line 86, LED 90 emits no light, and transistor 96 permits no current to flow through LED 24. LED 24 thus works as a pilot light for dimmer 26, and switch 22 acts as an on/off switch for dimmer 26.

Isolation region 106, shown in crosshatch, is bridged by relay 108 and optocoupler 110. These devices are selected to meet the requirements of the National Electrical Code for 2500 V of isolation between inputs and outputs. Relay model #G6B-114P-US-12V, manufactured by Omron Corporation of Japan, and optocoupler model #4N25, manufactured by General Electric, are typical of devices that meet this requirement. Although relay 108 and optocupler 110 work equally well at transmitting on/off signals through isolation region 106, optocoupler 110 has some advantages when more complex signals are transmitted. Since an optocoupled transistor is a linear device when operated in its active region, analog signals (such as intensity levels) can be transmitted from input to output through the isolation region. Transistors are also inherently much faster than relays; thus, much higher data rates are possible.

Figure 5:
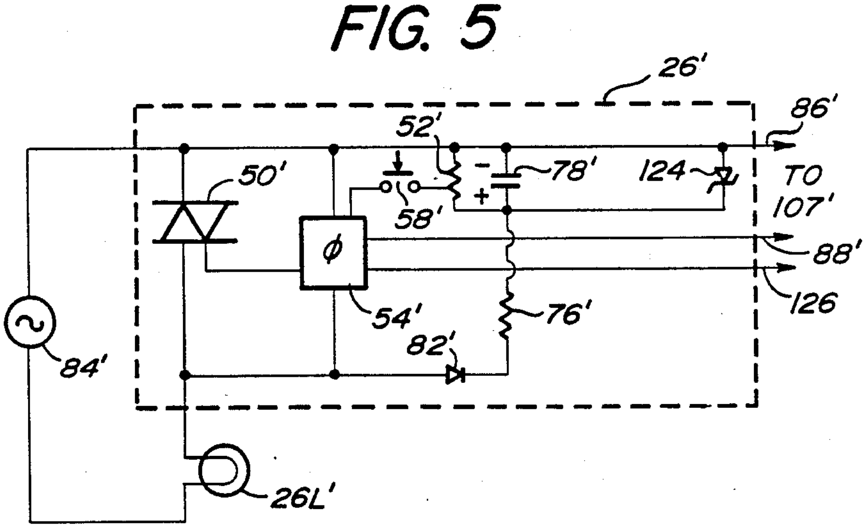
FIG. 5 is a schematic of elements of an alternative embodiment of FIG. 3.

FIG. 5 shows a variation of dimmer 26 that can communicate with a master control means via analog signals. Source 84′, triac 50′, load 26L′, diode 82′, resistor 76′, potentiometer 52′, and capacitor 78′ are substantially similar to the correspondingly numbered elements of FIG. 3. Phase control circuit 54′ is designed to accept a variable DC voltage as an input to set the firing angle of triac 50′. This is accomplished with any commonly available phase control integrated circuit, such as the U208B manufactured by Telefunken, Inc. Switch 58′ is in series with the wiper of potentiometer 52′, so that closing switch 58′ transmits to phase control circuit 54′ the voltage present on the wiper of potentiometer 52′. Line 126 provides an alternative input to 54′ that allows master control 21 to control the firing angle of triac 50′. Circuit 54′ supplies a variable DC voltage between lines 86′ and 88′ which is proportional to the voltage supplied to load 26L′. Zener diode 124 regulates the voltage across capacitor 78′ and potentiometer 52′. Regulation is desirable here, since 54′ is a voltage controlled circuit.

Figure 6:
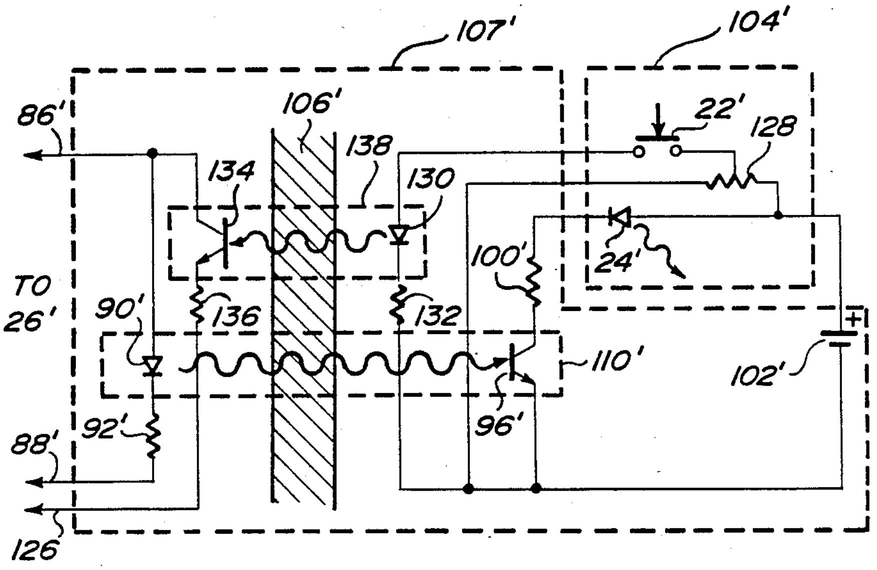
FIG. 6 is a schematic of elements of an alternative embodiment of FIG. 4.

FIG. 6 shows the interface and master control schematics that are associated with dimmer 26′ of FIG. 5. Capacitor 102′, LED 24′, switch 22′, optocoupler 110′, resistor 92′, resistor 100′, and isolation 106′ are substantially similar to the correspondingly numbered elements of FIG. 4. Between lines 86′ and 88′ is a variable DC voltage that is controlled by dimmer 26′ and is proportional to the voltage supplied to load 26L′. This variable DC voltage varies the current flowing through LED 90′ and, therefore, through transistor 96′ and LED 24′. Thus, the brightness of LED 24′ on master control 21 will vary in proportion to the brightness of load 26L′. Alternatively, LED 24′ could be a linear array of LEDs that successively light as the power to load 26L′ is increased. Master switch 22′ is connected in series with the wiper of potentiometer 128, resistor 132 and LED 130 of optocoupler 138. The current through LED 130 is thus determined by the wiper position of potentiometer 128, when switch 22′ is closed. Thus, a variable DC current, determined by the wiper position of potentiometer 128 flows through transistor 134 and line 126 into circuit 54′ (FIG. 5) to control the firing angle of triac 50′.

As shown in FIG. 6, LED 90′, resistors 92′ and 136, and phototransistor 134 are in electrical contact with lines 86′, 88′, and 126, which are in contact with various circuit components of dimmer 26′ (see FIG. 5). Since they are in electrical connection, these circuit components could be designed to exit inside of dimmer 26′. Similarly, LED 130, resistors 132 and 100′, capacitor 102′, and phototransistor 96′ could be designed to exist inside a master control, since they are in electrical connection with circuit 104′ of a master control. The only system component that would remain would be isolation 106′. This isolation could be accomplished by using fiber optic cable to connect phototransistor 134 and LED 90′ (now of dimmer 26′) to LED 130 and photo transistor 96′, respectively (now of a master control). Fiber optic cables are electrically nonconductive and therefore meet National Electrical Code requirements for isolation. The communication between dimmer 26′ and a master control would thus be in the form of light signals transmitted through fiber optic cables.

Since certain changes may be made in the above apparatus without departing from the scope of the invention herein involved, it is intended that all matter contained in the above description or shown in the accompanying drawings shall be interpreted in an illustrative and not a limiting sense.

I claim:

1. A system to control power from an a.c. line to a plurality of loads, including lighting loads, comprising, in combination, (a) a plurality of wallbox dimmers, each controlling power to one of said lighting loads, each of said dimmers comprising, in proximate relationship, (i) a dimming circuit to control power to said load, (ii) dimmer control means to provide a dimmer control signal to said dimming circuit for determining power to said load, and (iii) switch means in electrical communication with said dimming circuit to turn power to said load off and on to a level determined by said dimming circuit;

(b) master control means to provide, for each of said loads, a master control signal for determining power to said load; and (c) isolation means to accept said master control signals from said master control means and provide output signals to corresponding dimming circuits.

2. The system of claim 1 in which said dimmers are incandescent lamp dimmers.

3. The system of claim 1 in which said dimmers are gas discharge lamp dimmers.

4. The system of claim 1 in which said loads include non-lighting loads.

5. The system of claim 1 in which said dimming circuit is a phase control circuit.

6. The system of claim 1 in which said dimmer control means comprises an actuator positionable for varying the power provided through said dimming circuit to said load.

7. The system of claim 6 in which said switch means comprises a push button on said actuator.

8. The system of claim 6 in which said switch means comprises a push-button next to said actuator.

9. The system of claim 6 in which said switch means is operated by moving said actuator.

10. The system of claim 1 in which said master control means and said isolation means are combined into a single housing.

11. The system of claim 1 in which more than one of said dimmers are controlled by a single output signal from said master control.

12. The system of claim 1 in which said input to said isolation means are carried by Class 2 circuits, which generally carry lower voltages and have certain power limitations, and said output signals are substantially line voltage.

13. The system of claim 1 further comprising an auxiliary source of input signals to said isolation means.

14. The system of claim 13 in which said auxiliary source provides a switch closure input signal.

15. The system of claim 13 in which said auxiliary source provides an electrical input signal.

16. The system of claim 13 in which said auxiliary source provides a radiated input signal.

17. The system of claim 16 in which said radiated input signal is an infrared signal.

18. The system of claim 16 in which said radiated input signal is a radio frequency signal.

19. The system of claim 1 in which said isolation means are commonly housed with at least one of said dimmers.

20. The system of claim 1 in which said isolation means comprises a fiber optic cable.

21. The system of claim 1 in which at least one of said dimmers is adapted to provide an output signal determined by the on/off status of said dimmer.

22. The system of claim 21 further comprising status indicator means to accept an on/off status signal from said dimmer and to provide a corresponding signal to said master control means.

23. The system of claim 22 in which said input signals from said dimmers and said output signals to said master control means are light level intensity signals.

24. The system of claim 1 in which said input signals from said master control means and said output signals to said dimmers are on/off signals.

25. The system of claim 1 in which said input signals from said master control means and said output signals to said dimmers are light level intensity signals.

26. The system of claim 1 in which said master control means independently turns each of said dimmers on and off.

27. The system of claim 22 further comprising means for displaying the on/off status of said lighting loads on said master control means.

28. The system of claim 22 further comprising means for displaying the on/off status of said lighting loads on said dimmers.

29. The system of claim 22 further comprising means for displaying the on/off status of said lighting loads on both said master control means and said dimmers.

30. The system of claim 27 in which said means for displaying lighting load status is an LED lamp.

31. The system of claim 28 in which said means for displaying lighting load status is an LED lamp.

32. The system of claim 1 further comprising means for directing to said dimming circuit said dimmer control signal or said master control signal, whichever is provided last.

33. A system to control power from an a.c. line to a plurality of loads, including lighting loads, comprising, in combination, (a) a plurality of wallbox dimmers, each controlling power to one of said lighting loads, each of said dimmers comprising, in proximate relationship, (i) a dimming circuit to control power to said load and (ii) switch means in electrical communication with said dimming circuit to turn power to said load off and on to a level determined by said dimming circuit;

(b) master control means to provide, for each of said loads, a signal to turn power to said load off and on to a level determined by said dimming circuit; and (c) isolation means to accept said signals from said master control means and provide output signals to corresponding dimming circuits.

* * * * *